(12) United States Patent
Cho

(10) Patent No.: US 11,363,414 B2
(45) Date of Patent: Jun. 14, 2022

(54) METHOD FOR CREATING POSITIONING SUPPORT TABLE AND POSITIONING USING THE POSITIONING SUPPORT TABLE

(71) Applicant: Locaila,Inc, San Jose, CA (US)

(72) Inventor: Jaihyung Cho, Daejeon (KR)

(73) Assignee: Locaila, Inc, San Jose, CA (US)

( * ) Notice: Subject to any disclaimer, the term of this patent is extended or adjusted under 35 U.S.C. 154(b) by 316 days.

(21) Appl. No.: 16/733,903

(22) Filed: Jan. 3, 2020

(65) Prior Publication Data
US 2021/0211837 A1 Jul. 8, 2021

(51) Int. Cl.
*H04W 24/00* (2009.01)
*H04W 4/029* (2018.01)

(52) U.S. Cl.
CPC .................. *H04W 4/029* (2018.02)

(58) Field of Classification Search
CPC ....... H04W 4/02; H04W 4/023; H04W 4/024; H04W 4/025; H04W 4/029; H04W 40/20; G01S 1/00; G01S 1/02; G01S 1/022; G01S 1/024; G01S 1/026; G01S 5/00; G01S 5/0252; G01S 5/02521; G01S 5/02524; G01S 5/14; G01S 5/145; G01S 5/30
See application file for complete search history.

(56) References Cited

U.S. PATENT DOCUMENTS

| 10,484,822 B1* | 11/2019 | Saxena | H04W 4/029 |
| 2002/0184653 A1* | 12/2002 | Pierce | G01S 5/0054 725/143 |

* cited by examiner

*Primary Examiner* — Matthew W Genack
(74) *Attorney, Agent, or Firm* — Nicholas Park

(57) ABSTRACT

Provided is a positioning support table generation method performed by a computing apparatus, the method including generating a three-dimensional (3D) map based on geographic and building information about a predetermined area; setting a plurality of grid points on the 3D map; determining a first base station corresponding to a grid point with respect to each of the plurality of grid points set on the 3D map; calculating at least one physical parameter about a first signal that arrives at the grid point from the first base station and at least one physical parameter about a second signal that arrives at the gird point from a second base station that is one of base stations adjacent to the first base station; and generating a positioning support table based on the at least one physical parameter about the first signal and the at least one physical parameter about the second signal.

14 Claims, 8 Drawing Sheets

FIG. 5

| | Grid point ID | Grid point coordinates | Attenuation | Neighbor access 1 | | | | | Neighbor access 2 | | | | | ... |
|---|---|---|---|---|---|---|---|---|---|---|---|---|---|---|
| | | | | Distance difference | Angle difference | Attenuation | ... | Correction value | Distance difference | Angle difference | Attenuation | ... | Correction value | |
| Access A grid table | 1 | $x_1, y_1, z_1$ | $W_{a1}$ | $L_{a11}$ | $\theta_{a11}$ | $W_{a11}$ | ... | $d_{a11}$ | $L_{a12}$ | $\theta_{a12}$ | $W_{a12}$ | ... | $d_{a21}$ | ... |
| | 2 | $x_2, y_2, z_2$ | $W_{a2}$ | $L_{a21}$ | $\theta_{a21}$ | $W_{a21}$ | ... | $d_{a21}$ | $L_{a22}$ | $\theta_{a22}$ | $W_{a22}$ | ... | $d_{a22}$ | ... |
| | 3 | $x_3, y_3, z_3$ | $W_{a3}$ | $L_{a31}$ | $\theta_{a31}$ | $W_{a31}$ | ... | $d_{a31}$ | $L_{a32}$ | $\theta_{a32}$ | $W_{a32}$ | ... | $d_{a32}$ | |
| | 4 | $x_4, y_4, z_4$ | $W_{a4}$ | $L_{a41}$ | $\theta_{a41}$ | $W_{a41}$ | | $d_{a41}$ | $L_{a42}$ | $\theta_{a42}$ | $W_{a42}$ | | $d_{a42}$ | |
| | ... | | | | | | | | | | | | ... | |
| Access B grid table | 11 | $x_{11}, y_{11}, z_{11}$ | $W_{b1}$ | $L_{b11}$ | $\theta_{b11}$ | $W_{b11}$ | ... | $d_{b11}$ | $L_{b12}$ | $\theta_{b12}$ | $W_{b12}$ | ... | $d_{b21}$ | ... |
| | 12 | $x_{12}, y_{12}, z_{12}$ | $W_{b2}$ | $L_{b21}$ | $\theta_{b21}$ | $W_{b12}$ | | $d_{b21}$ | $L_{b22}$ | $\theta_{b22}$ | $W_{b22}$ | | $d_{b22}$ | |
| | 13 | $x_{13}, y_{13}, z_{13}$ | $W_{b3}$ | $L_{b31}$ | $\theta_{b31}$ | $W_{b13}$ | | $d_{b31}$ | $L_{b32}$ | $\theta_{b32}$ | $W_{b32}$ | | $d_{b32}$ | |
| | 14 | $x_{14}, y_{14}, z_{14}$ | $W_{b4}$ | $L_{b41}$ | $\theta_{b41}$ | $W_{b14}$ | | $d_{b41}$ | $L_{b42}$ | $\theta_{b42}$ | $W_{b42}$ | | $d_{b42}$ | |
| | ... | | | | | | | | ... | | | | ... | |
| Access C grid table | 21 | $x_{21}, y_{21}, z_{21}$ | $W_{c1}$ | $L_{c11}$ | $\theta_{c11}$ | $W_{c11}$ | ... | $d_{c11}$ | $L_{c12}$ | $\theta_{c12}$ | $W_{c21}$ | ... | $d_{c21}$ | ... |
| | 22 | $x_{22}, y_{22}, z_{22}$ | $W_{c2}$ | $L_{c21}$ | $\theta_{c21}$ | $W_{c12}$ | | $d_{c21}$ | $L_{c22}$ | $\theta_{c22}$ | $W_{c22}$ | | $d_{c22}$ | |
| | 23 | $x_{23}, y_{23}, z_{23}$ | $W_{c3}$ | $L_{c31}$ | $\theta_{c31}$ | $W_{c13}$ | | $d_{c31}$ | $L_{c32}$ | $\theta_{c32}$ | $W_{c32}$ | | $d_{c32}$ | |
| | 24 | $x_{24}, y_{24}, z_{24}$ | $W_{c4}$ | $L_{c41}$ | $\theta_{c41}$ | $W_{c14}$ | | $d_{c41}$ | $L_{c42}$ | $\theta_{c42}$ | $W_{c42}$ | | $d_{c42}$ | |
| | ... | | | | | | | | | | | | | |

C1, C2, C3, C4, C5, C6 indicate column labels.

METHOD FOR CREATING POSITIONING SUPPORT TABLE AND POSITIONING USING THE POSITIONING SUPPORT TABLE

BACKGROUND

The present disclosure of the following description relates to a method of generating a positioning support table, and more particularly, to a method of estimating a position of a user equipment using a positioning support table.

A communication system may include a core network, for example, a mobility management entity (MME), a serving gateway (SGW), a packet data network (PDN) gateway (PGW), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

In a communication system, a UE may generally transmit and receive data through a base station. For example, if data to be transmitted to a second UE is present, a first UE may generate a message including the data to be transmitted to the second UE and may transmit the generated message to a first base station to which the first UE belongs. The first base station may receive the message from the first UE and may verify that a destination of the received message is the second UE. The first base station may transmit the message to a second base station to which the verified destination, that is, the second UE belongs in a second base station addition time section. The second base station may receive the message from the first base station and may verify that the destination of the received message is the second UE. The second base station may transmit the message to the verified destination, that is, the second UE. The second UE may receive the message from the second base station and may acquire the data included in the received message.

A UE may receive a positioning signal from a base station and may estimate a position of the UE based on a time of arrival (TOA) of the positioning signal or a time difference of arrival (TDOA). If an obstacle is present between the UE and the base station, the positioning signal may arrive at the UE through a multipath. A pseudo range of the positioning signal may vary based on a straight distance between the UE and the base station. Accordingly, the positioning performance of the UE may be degraded.

SUMMARY OF THE INVENTION

At least one example embodiment provides a method and apparatus for generating a positioning support table from a three-dimensional (3D) map about a predetermined area.

At least one example embodiment also provides a method of estimating a position of a user equipment (UE) using a positioning support table.

According to an aspect, there is provided a positioning support table generation method performed by a computing apparatus, the method including generating a three-dimensional (3D) map based on geographic and building information about a predetermined area; setting a plurality of grid points on the 3D map; determining a first base station corresponding to a grid point with respect to each of the plurality of grid points set on the 3D map; calculating at least one physical parameter about a first signal that arrives at the grid point from the first base station and at least one physical parameter about a second signal that arrives at the gird point from a second base station that is one of base stations adjacent to the first base station; and generating a positioning support table based on the at least one physical parameter about the first signal and the at least one physical parameter about the second signal.

According to another aspect, there is provided a positioning method performed by a user equipment, the method including acquiring information about a positioning support table that is generated based on at least one physical parameter about a first signal that arrives at a grid point from a first base station set with respect to each of a plurality of grid points set on a 3D map about a predetermined area and at least one physical parameter about a second signal that arrives at the grid point from a second base station that is one of base stations adjacent to the first base station; receiving positioning signals from at least two base stations; and extracting at least one grid point from among the plurality of grid points based on positioning information about the positioning signals and information recorded in the positioning support table.

According to at least one example embodiment, it is possible to maintain a relatively high positioning performance using a positioning support table without significantly reducing an update period of the positioning support table. Therefore, it is possible to reduce cost required to update the positioning support table.

Also, according to at least one example embodiment, it is possible to easily extract a grid point corresponding to an environment similar to an actual environment using a positioning support table.

Also, according to at least one example embodiment, it is possible to improve a positioning performance by correcting a candidate position using a correction value stored in a positioning support table.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 5 illustrates an example of a schema of a positioning support table according to at least one example embodiment.

DETAILED DESCRIPTION OF THE INVENTION

Figure 1:
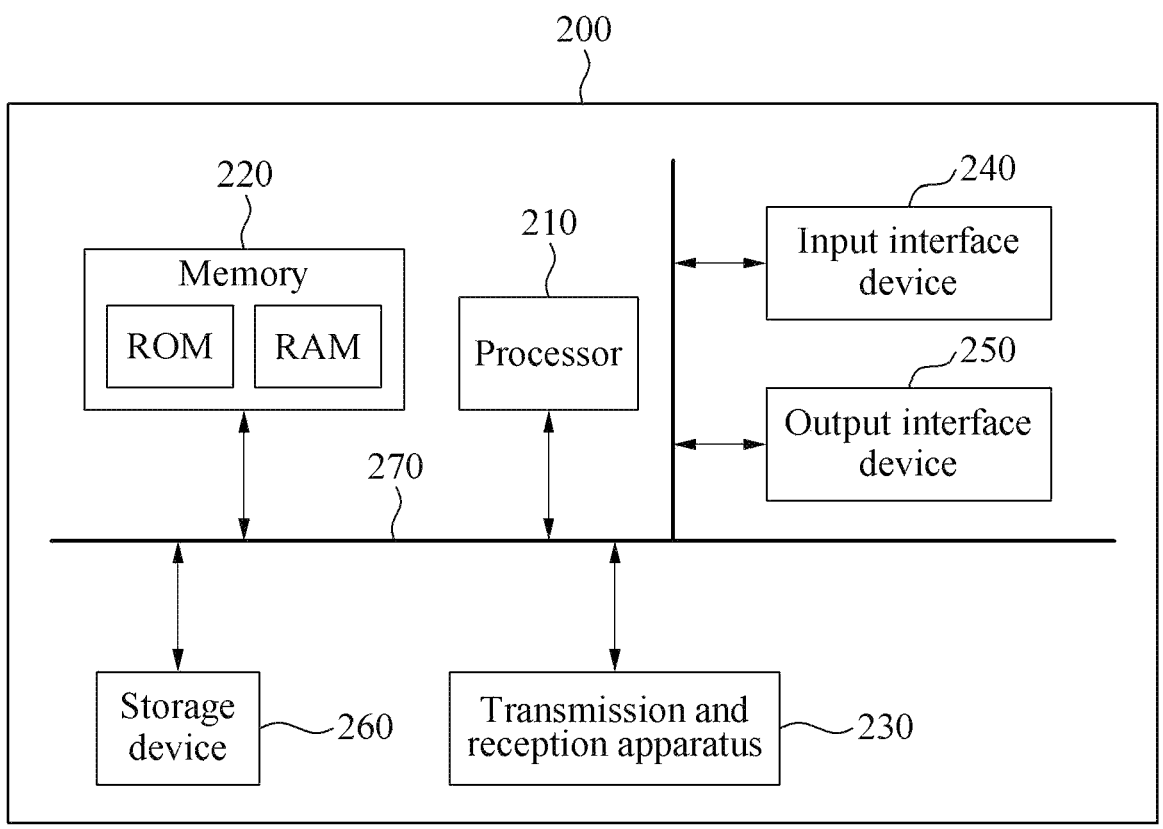
FIG. 1 is a block diagram illustrating an example of a configuration of a node that constitutes a communication system according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present. In contrast, when a component is referred to as being "directly connected to" or "directly coupled to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Herein, a reference signal may include, for example, a signal for positioning of a user equipment (UE), a signal for synchronization of the UE or a base station, and the like. However, it is provided as an example only. A method of estimating a reception delay time of a reference signal disclosed herein may apply to estimating a reception delay time of another signal aside from the reference signal. Here, although an example embodiment is described based on an example of estimating the reception delay time of the reference signal for clarity of description, it is provided as an example only. It should be understood that a method of estimating the reception delay time of the other signal aside from the reference signal is included in the example embodiment.

FIG. 1 is a block diagram illustrating an example of a configuration of a node that constitutes a communication system according to at least one example embodiment.

Herein, the node may refer to at least one of a base station and a UE included in the communication system and a computing apparatus configured to generate a positioning support table. The computing apparatus is described below. The base station may also be referred to as a node base (NodeB), an evolved NodeB, a next generation NodeB, a base transceiver station (BTS), a radio base station, a radio transceiver, an access point, an access node, a road side unit (RSU), a radio remote head (RRH), a transmission point (TP), a transmission and reception point (TRP), a relay node, and the like. The UE may also be referred to as a terminal, an access terminal, a mobile terminal, a station, a subscriber station, a mobile station, a portable subscriber station, a node, a device, and the like.

Referring to FIG. 1, a node 200 may include at least one processor 210, a memory 220, and a transmission and reception apparatus 230 configured to perform communication through connection to a network. Also, the node 200 may further include an input interface device 240, an output interface device 250, and a storage device 260. Here, the input interface device 240 and the output interface device 250 may constitute a communication interface. The components included in the node 200 may communicate with each other through connection to a bus 270.

The processor 210 may execute a program command stored in at least one of the memory 220 and the storage device 260. The processor 210 may refer to a central processing unit (CPU), a graphics processing unit (GPU), or an exclusive processor that performs methods according to example embodiments. Each of the memory 220 and the storage device 260 may be configured as at least one of a volatile storage medium and a nonvolatile storage medium. For example, the memory 220 may be configured as at least one of read only memory (ROM) and random access memory (RAM).

The positioning support table may include information used to estimate a position of a UE. In urban or indoor environments, radio waves may be diffracted or reflected without reaching the UE at a straight distance. Accordingly, a signal transmitted from a base station reaches the UE through a multipath and accordingly, a distance between the UE and the base station estimated by the UE based on a result of measuring a positioning signal may differ from an actual straight distance between the UE and the base station. Therefore, a positioning performance may be degraded. The positioning support table may include information capable of enhancing the positioning performance by applying geographic and building information of an area included in coverage of a positioning service. Hereinafter, a method of generating a positioning support table according to at least one example embodiment and an example of information included in the positioning support table will be further described.

Figure 2:
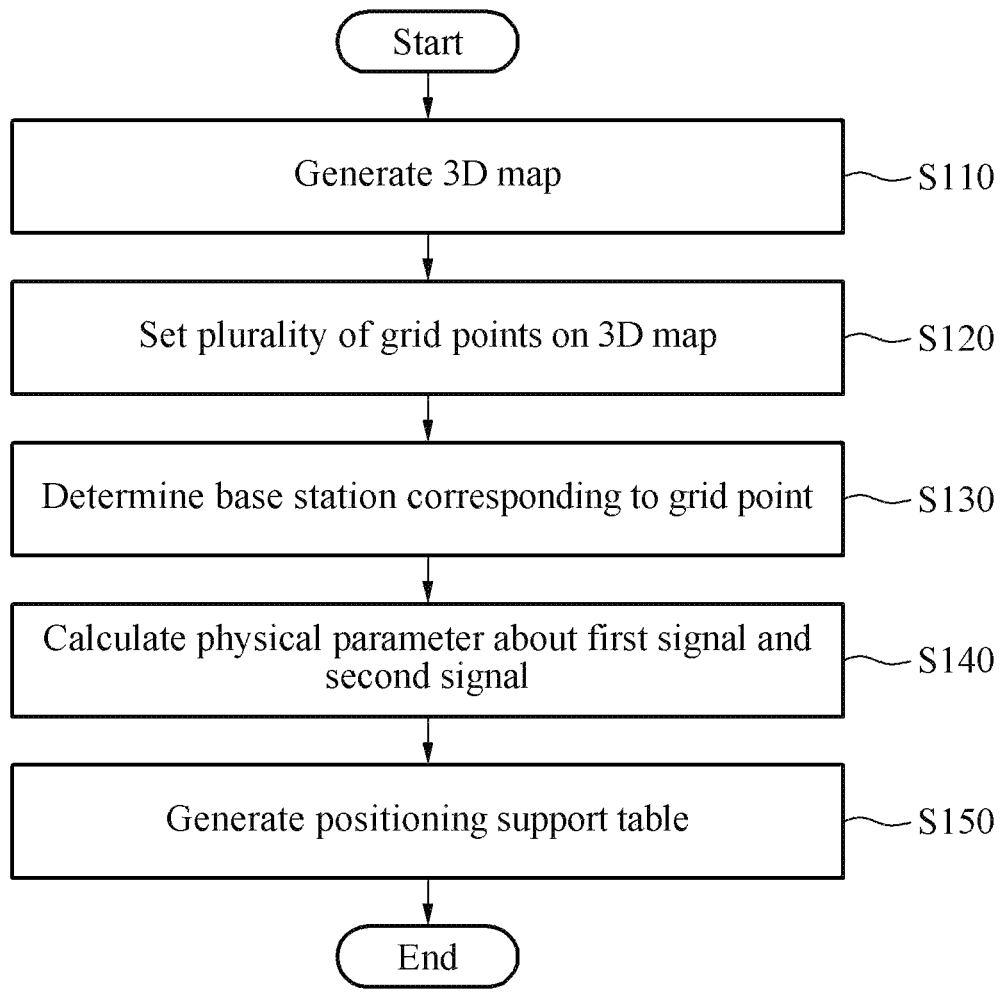
FIG. 2 is a flowchart illustrating an example of a method of generating, by a computing apparatus, a positioning support table according to at least one example embodiment.

FIG. 2 is a flowchart illustrating an example of a method of generating, by a computing apparatus, a positioning support table according to at least one example embodiment.

The method of generating the positioning support table may be performed by a base station or a computing apparatus separate from the base station. When the positioning support table is generated by the base station, the base station may transmit the generated positioning support table to a UE that accesses the base station. As another example, when the positioning support table is generated by the computing apparatus separate from the base station, the base station may acquire and store information about the positioning support table from the computing apparatus. Hereinafter, for clarity of description, an entity that generates the positioning support table is described as the computing apparatus.

Referring to FIG. 2, in operation S110, the computing apparatus may generate a 3D map based on geographic and building information about a predetermined area. The computing apparatus may generate the 3D map using a 3D spatial modeling scheme. The 3D map may include numerical number information to which geographic features, buildings, structures, etc., about the area are applied. The 3D map may further include information about a position of the base station within the area. The area may be determined based on a positioning service coverage. The computing apparatus may generate the 3D map based on geographic features, buildings, structures, and positions, heights, and areas thereof about the predetermined area. The computing apparatus may include, in the 3D map, information about a texture, a surface shape, etc., of a building or a structure. Therefore, the computing apparatus may simulate a path of a signal by applying the texture, the surface shape, etc., of the building or the structure.

In operation S120, the computing apparatus may set a plurality of grid points on the 3D map. The computing apparatus may set an interval between grid points based on a desired positioning accuracy. The computing apparatus may set the interval between the grid points to be constant. As another example, the computing apparatus may set an interval between a portion of the grid points to be different from an interval between another portion of the grid points based on geographic features, buildings, structures, etc., of the 3D map.

In operation S130, the computing apparatus may determine a first base station corresponding to a grid point with respect to each of the grid points. For example, if a serving base station for a UE present at a grid point is predetermined based on a predetermined communication protocol, the computing apparatus may determine the serving base station of the UE present at the grid point as the first base station. As another example, the computing apparatus may determine, as the first base station, a base station that is positioned at a position corresponding to a shortest straight distance from the grid point based on a simulation result. As another example, the computing apparatus may determine, as the first base station, a base station corresponding to a shortest pseudo range of a signal that arrives at the grid point from the base station based on the simulation result. Here, the pseudo range may represent a range of a path through which the signal transmitted from the base station arrives at a target point. If the signal is diffracted or reflected by a building or a structure, the pseudo range may be greater than a straight distance between the base station and the grid point. Unless the signal is diffracted or reflected, the pseudo range may be equal to the straight distance. As another example, the computing apparatus may determine, as the first base station, a base station corresponding to a highest strength of a signal that arrives at the grid point based on the simulation result. However, the aforementioned methods of determining the first base station are provided as examples only and are not limited thereto.

In operation S140, the computing apparatus may calculate at least one physical parameter about a first signal that arrives at the grid point from the first base station and at least one physical parameter about a second signal that arrives at the gird point from a second base station that is one of base stations adjacent to the first base station. The at least one physical parameter may include pseudo ranges of the first signal and the second, angles of arrival (AoA) of the first signal and the second signal, and the like.

Figure 3:
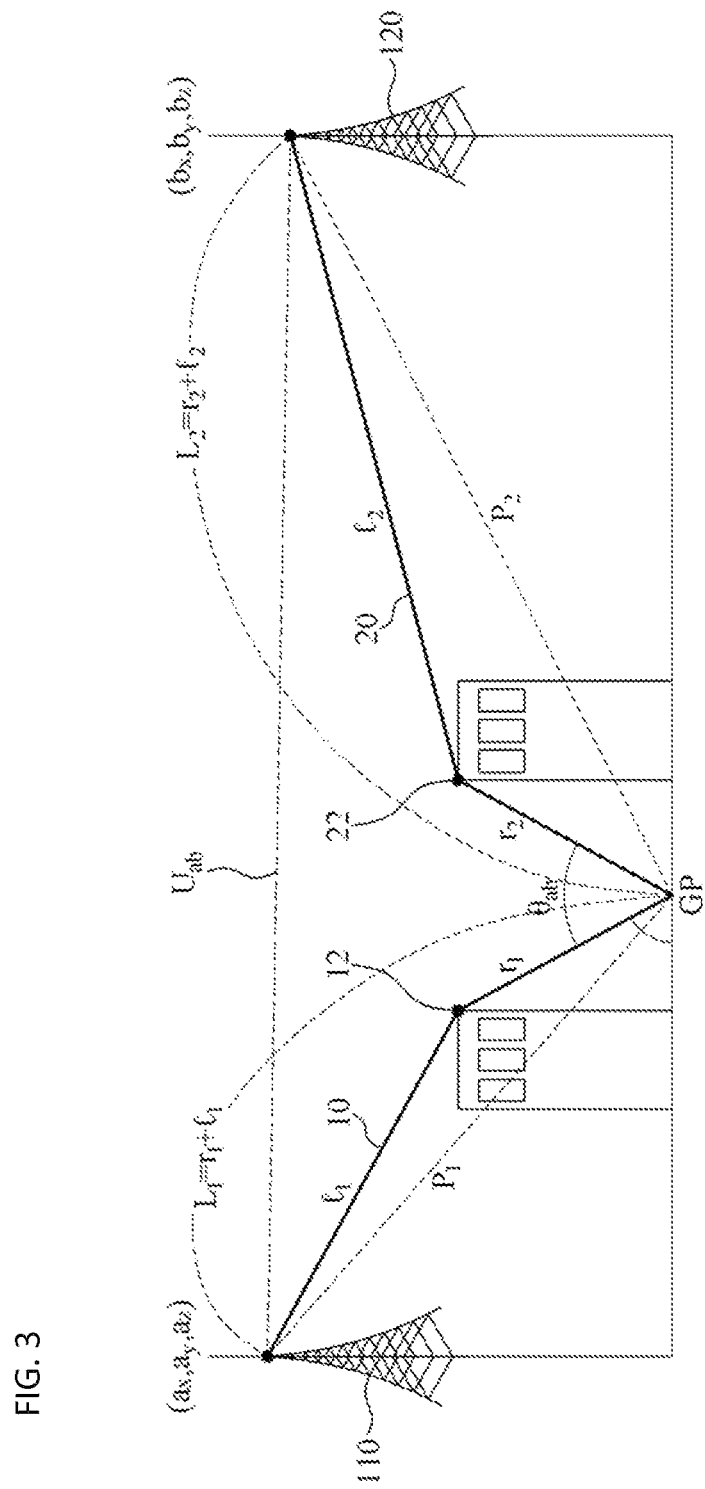
FIG. 3 illustrates an example of parameters calculated by a computing apparatus based on a grid point according to at least one example embodiment.
Figure 4:
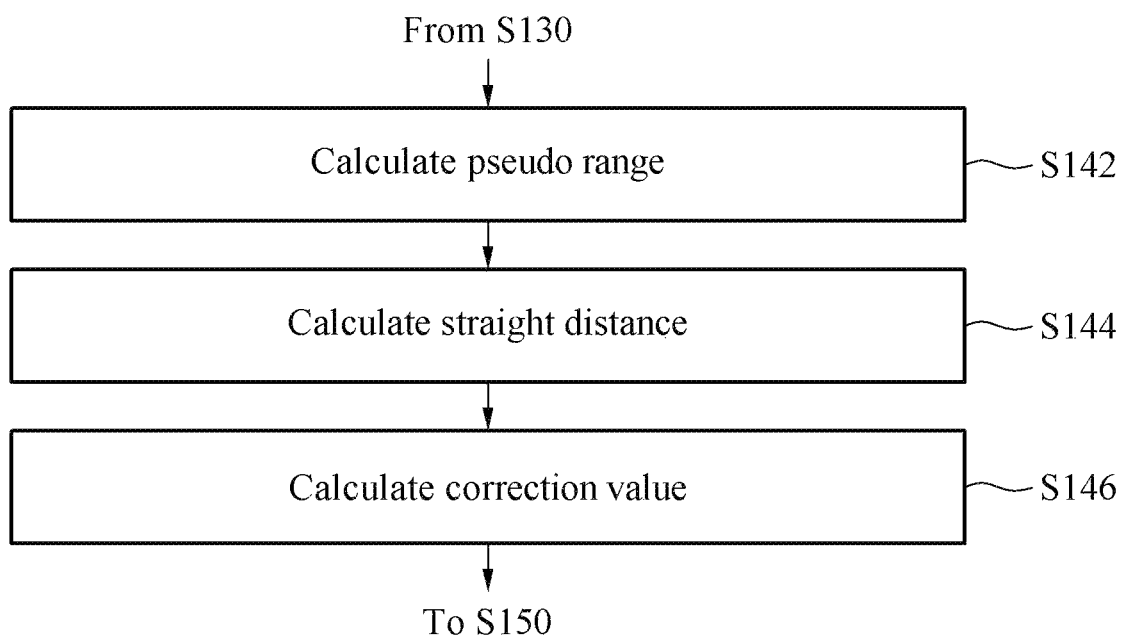
FIG. 4 is a flowchart illustrating an example of a process of performing operation S140 of FIG. 2.

FIG. 3 illustrates an example of parameters calculated by a computing apparatus based on a grid point GP according to at least one example embodiment, and FIG. 4 is a flowchart illustrating an example of a process of performing operation S140 of FIG. 2.

Referring to FIG. 3, a first base station 110 may be set for the grid point GP. Also, a second base station 120 that is one of base stations adjacent to the first base station 110 may be set for the grid point GP. Although FIG. 3 illustrates only the first base station 110 and the second base station 120, it is provided as an example only. For example, the computing apparatus may further store parameters calculated with respect to the first base station 110 and a third base station (not shown) in the positioning support table as well as parameters calculated with respect to the first base station 110 and the second base station 120.

In operation S142, the computing apparatus may calculate a first pseudo range $L_1$ between the first base station 110 and the grid point GP and a second pseudo range $L_2$ between the second base station 120 and the grid point GP. For example, the computing apparatus may calculate the first pseudo range $L_1$ and the second pseudo range $L_2$ based on a simulation. The computing apparatus may calculate the first pseudo range $L_1$ by calculating a distance of a shortest path among multiple paths of a first signal 10. The computing apparatus may calculate the second pseudo range $L_2$ by calculating a distance of a shortest path among multiple paths of a second signal 20.

In operation S144, the computing apparatus may calculate a straight distance $P_1$ between the first base station 110 and the grid point GP and a second straight distance $P_2$ between the second base station 120 and the grid point GP. For example, the computing apparatus may calculate the first straight distance $P_1$ and the second straight distance $P_2$ based on the simulation. If the first signal 10 is not diffracted at a point 12, the first pseudo range $L_1$ may be identical to the first straight distance $P_1$. If the second signal 20 is not diffracted at point 22, the second pseudo range $L_2$ may be identical to the second straight distance $P_2$.

For example, information about a difference of straight distance between the first straight distance $P_1$ and the second straight distance $P_2$ may be required for the UE to estimate a position of the UE based on a trilateration. However, if a signal passes through a multipath through diffraction or reflection as shown in FIG. 3, a difference of pseudo range between the first pseudo range $L_1$ and the second pseudo range $L_2$ may be different from the difference of straight distance between the first straight distance $P_1$ and the second straight distance $P_2$. Accordingly, the difference may need to be corrected.

In operation S146, the computing apparatus may calculate a correction value based on the difference of pseudo range and the difference of straight distance. For example, the computing apparatus may calculate the correction value according to Equation 1.

$$d_{a11} = (L_1 - P_1) - (L_2 - P_2) \quad \text{[Equation 1]}$$

In Equation 1, $d_{a11}$ denotes a correction value used to correct a difference between the difference of pseudo range and the difference of straight distance, $L_1$ denotes the first pseudo range, $L_2$ denotes the second pseudo range, $P_1$ denotes the first straight distance, and $P_2$ denotes the second straight distance.

For example, the UE may acquire information about the difference of pseudo range ($L_1-L_2$) based on a time of arrival (TOA), a time and difference of arrival (TDOA), or a phase difference between received signals. The UE may acquire information about the difference of straight distance ($P_1-P_2$) by subtracting the correction value $d_{a11}$ from the difference of pseudo range.

As described above, the correction value $d_{a11}$ may be used to improve the positioning performance of the UE. The computing apparatus may calculate the correction value by substituting Equation 1 with the first pseudo range $L_1$, the second pseudo range $L_2$, the first straight distance $P_1$, and the second straight distance $P_2$ calculated in operation S144.

Referring again to FIG. 2, in operation S150, the computing apparatus may generate the positioning support table. The computing apparatus may perform operations S110 to S140 with respect to each of the plurality of grid points and may generate the positioning support table based on calculation results.

FIG. 5 illustrates an example of a schema of a positioning support table according to at least one example embodiment.

Referring to FIG. 5, information about IDs of grid points may be stored in a column C2 of the positioning support table. Coordinates information of a grid point corresponding to each ID may be stored in a column C3. ID information about a first base station, for example, a serving base station, corresponding to each grid point may be stored in a column C1. Information about a difference of pseudo range calculated between the first base station and a second base station adjacent to the first base station at each grid point may be stored in a column C4. Information about a correction value calculated based on the first base station and the second base station at each grid point may be stored in a column C6. Referring to FIG. 5, information about a difference of pseudo range calculated based on the first base station and a third base station adjacent to the first base station may be further stored in the column C6.

The positioning support table may further include additional information in addition to the difference of pseudo range and the correction value. For example, the positioning support table may also include information about signal attenuation. Also, referring to a column C5, the positioning support table may also include information about an angle of arrival (AOA) difference calculated based on the first base station and the second base station.

Referring again to FIG. 3, the computing apparatus may calculate an AoA difference $\theta_{ab}$ between the first signal 10 and the second signal 20 based on a travel distance $r_1$ of the first signal 10 that arrives at the grid point GP after diffraction and a travel distance $r_2$ of the second signal 20 that arrives at the grid point GP after diffraction. For example, the computing apparatus may calculate the AoA difference $\theta_{ab}$ according to Equation 2.

$$\theta_{ab} = \arccos((r_1^2 + r_2^2 - g_{ab}^2)/(2r_1 \ast r_2)) \quad \text{[Equation 2]}$$

In Equation 2, $r_1$ denotes a length of a last straight line segment in the multipath of the first signal 10. If the first signal 10 is neither diffracted nor reflected, $r_1$ may be identical to the first pseudo range $L_1$. Also, $r_2$ denotes a length of a last straight line segment in the multipath of the second signal 20. If the second signal 20 is neither diffracted nor reflected, $r_2$ may be identical to the second pseudo range $L_2$. Also, $g_{ab}$ denotes a distance between the point 12 at which the first signal 10 is finally reflected or diffracted and the point 22 at which the second signal 20 is finally reflected or diffracted. Unless the first signal 10 and the second signal are diffracted or reflected, $g_{ab}$ may be identical to a distance $U_{ab}$ between the first base station 110 and the second base station 120.

The computing apparatus may calculate an AoA difference for each grid point and may store a calculation result in the positioning support table.

A schema of the positioning support table of FIG. 5 is provided as an example only. For example, the positioning support table may not include a portion of columns of FIG. 5. As another example, in addition to information of FIG. 5, the positioning support table may further include other information, such as, for example, a difference of straight distance, strength of arrival signal, a phase difference, delay spread information, propagation polarity information, angle of departure (AoD) of a signal from a base station, and the like.

If the positioning support table includes information about the difference of pseudo range and information about the correction value as shown in FIG. 5, the prestored positioning support table may be easily used although a channel environment varies in response to a change of weather and the like. For example, unless a parameter value, for example, a strength of signal, is updated based on a new environment in response to a change in the channel environment, the positioning performance using the positioning support table may be degraded. However, in the case of the difference of pseudo range, the correction value, and the like, which are prestored in the positioning support table, although the weather changes, the UE may continuously use existing stored information unless there is no change in a building or a geographic feature. Therefore, according to at least one example embodiment, a number of updates of the positioning support table may be reduced and the positioning performance using the positioning support table may be improved.

Hereinafter, a positioning method using a positioning support table according to at least one example embodiment is described. In the following description, description is made based on an example embodiment in which the UE performs positioning. However, it is provided as an example only. For example, if the UE transmits information about a signal reception point in time or a phase of a signal to the base station, the base station may perform positioning using the received information and the positioning support table.

Figure 6:
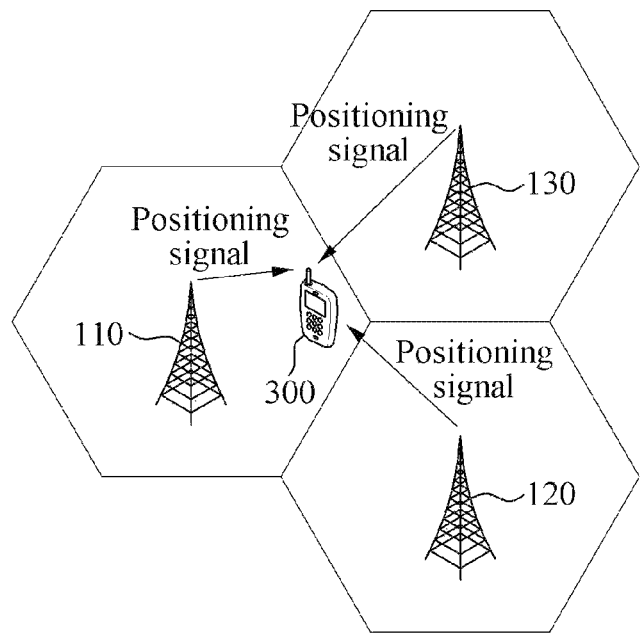
FIG. 6 illustrates an example of a positioning environment of a user equipment (UE) according to at least one example embodiment.

FIG. 6 illustrates an example of a positioning environment of a UE according to at least one example embodiment.

Referring to FIG. 6, a UE 300 may receive a positioning signal from a first base station 110. The UE 300 may receive a positioning signal from each of a second base station 120 and a third base station 130 adjacent to the first base station 110. The UE 300 may calculate a TOA, a TDOA, and the like, based on a point in time at which each of the positioning signals is received. The UE 300 may calculate a difference of pseudo range between the positioning signals based on the TOA or the TDOA. The UE 300 may calculate the difference of pseudo range based on a phase difference between the positioning signals. The UE 300 may extract at least one grid point by comparing the difference of pseudo range calculated based on the received positioning signals to the difference of pseudo range stored in the positioning support table. As another example, the UE 300 may extract at least one grid point by comparing a received strength of a positioning signal, a phase difference, and the like to values stored in the positioning support table. Although FIG. 6 illustrates three base stations that transmit a positioning signal to the UE, it is provided as an example only. For example, the UE 300 may receive a positioning signal from each of two base stations. As another example, the UE 300 may receive a positioning signal from each of at least four base stations.

Figure 7:
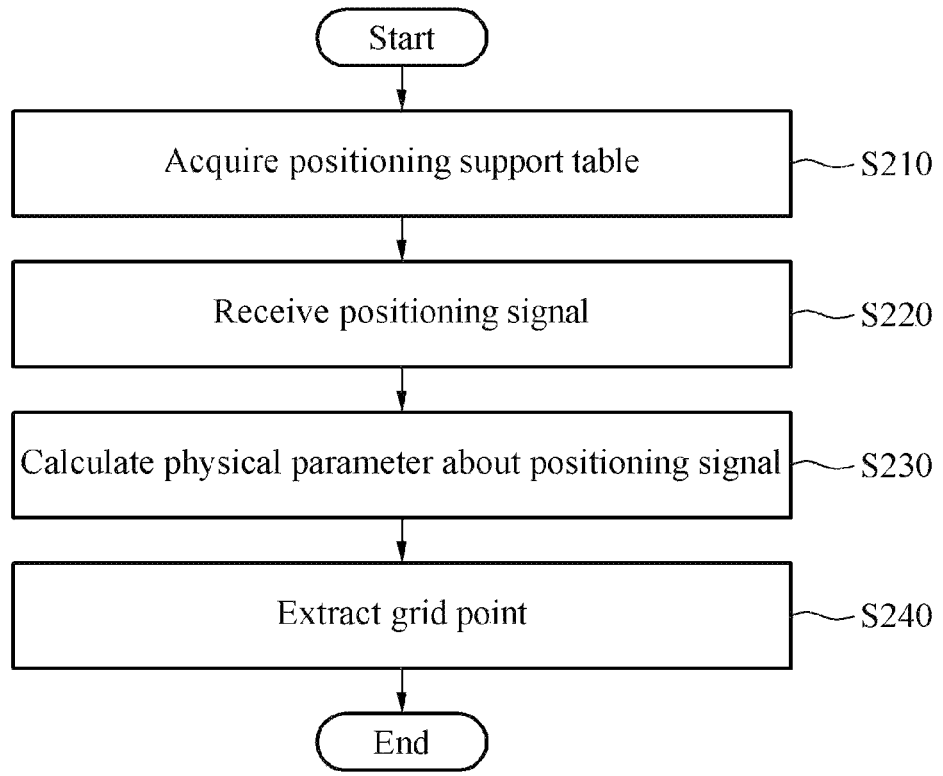
FIG. 7 is a flowchart illustrating an example of a positioning method of a UE according to at least one example embodiment.

FIG. 7 is a flowchart illustrating an example of a positioning method of a UE according to at least one example embodiment.

Referring to FIG. 7, in operation S210, the UE 300 may acquire a positioning support table. The UE 300 may receive information about the positioning support table from a serving base station. The UE 300 may store the positioning support table.

In operation S220, the UE 300 may receive positioning signals from a plurality of base stations, for example, the first to third base stations 110, 120, and 130. Each of the first to third base stations 110, 120, and 130 may transmit a pilot symbol based on a predetermined sequence. Each of the first to third base stations 110, 120, and 130 may periodically transmit a positioning signal. As another example, each of the first to third base stations 110, 120, and 130 may transmit a positioning signal in response to a request from the UE 300.

In operation S230, the UE 300 may calculate a physical parameter about the positioning signals. The UE 300 may calculate at least one of a TOA, TDOA, and a phase difference of the positioning signals. The UE 300 may calculate a difference of pseudo range between the positioning signals based on at least one of the calculated TOA, TDOA, and phase difference. For example, the UE 300 may calculate the TDOA of the positioning signals and may calculate the difference of pseudo range between the positioning signals according to Equation 3.

$$DoPR_a = \begin{bmatrix} \tau_a - \tau_b \\ \tau_a - \tau_c \\ \tau_a - \tau_d \\ \vdots \end{bmatrix} \times c = \begin{bmatrix} r_{ab} \\ r_{ac} \\ r_{ad} \\ \vdots \end{bmatrix} \quad \text{[Equation 3]}$$

In Equation 3, $DoPR_a$ denotes a vector that is determined based on the difference of pseudo range between the positioning signals, $\tau_i$ denotes a point in time at which a positioning signal transmitted from an i-th base station is received, c denotes a speed of light constant, and $r_{ij}$ denotes a difference of pseudo range between a positioning signal transmitted from an i-th base station and a positioning signal transmitted from a j-th base station.

As another example, the UE 300 may calculate an angle difference in direction of arrival between the positioning signals, a difference in received strength between the positioning signals, and the like.

In operation S240, the UE 300 may extract at least one grid point from among the plurality of grid points by comparing a parameter value calculated in operation S230 to values stored in the positioning support table.

For example, the UE 300 may extract at least one grid point from among the plurality of grid points based on the difference of pseudo range between the positioning signals and the difference of pseudo range stored in the positioning support table of FIG. 5. For example, the UE 300 may substitute a cost function with the difference of pseudo range between the positioning signals and values stored in the positioning support table, and may extract at least one grid point from among the plurality of grid points based on an output value of the cost function.

For example, the UE 300 may calculate the output value of the cost function according to Equation 4.

$$\text{Cost} = \min_i \sum_{k=b,c,d\ldots} (L_{aik} - r_{ak})^2 \quad \text{[Equation 4]}$$

In Equation 4, a denotes an index of the first base station 110 (e.g., a serving base station) set for the UE 300, k denotes an index of a base station adjacent to the first base station 110, and $L_{aik}$ denotes a difference of pseudo range stored in the positioning support table. In detail, $L_{aik}$ denotes a difference of pseudo range corresponding to an i-th grid point when an a-th base station and a k-th base station are set. Also, $r_{ak}$ denotes a difference of pseudo range between positioning signals received at the UE 300 from the a-th base station and the k-th base station.

Referring to Equation 4, the UE 300 may calculate the output value of the cost function using a method of least squares. The UE 300 may extract a grid point corresponding to a minimum output value of the cost function. As another example, the UE 300 may extract one or more grid points that meet a condition that the output value of the cost function is less than a reference value.

The cost function of Equation 4 is provided as an example only. For example, the UE 300 may calculate the output value of the cost function using a first norm calculation method, a Jaccard similarity calculation method, and the like. Also, although the foregoing description is made based on an example in which the UE 300 extracts a grid point using the difference of pseudo range, it is provided as an example only. For example, the UE 300 may measure or calculate delay spread information of a positioning signal, propagation polarity information, an angle of departure (AoD) from a base station, and may extract at least one grid point similar to an actual environment from the positioning support table.

The UE 300 may estimate a position of the UE 300 from the extracted grid point. For example, when the UE 300 extracts a single grid point, the UE 300 may estimate the extracted grid point as the position of the UE 300. As another example, when the UE 300 extracts a plurality of grid points, the UE 300 may estimate a center point of the plurality of grid points as the position of the UE 300. If necessary, the UE 300 may remove an outlier from among the plurality of grid points and may determine a center point of the remaining grid points as the position of the UE 300.

The UE 300 may estimate the position of the UE 300 by further performing a procedure of determining a candidate position from the extracted grid point and correcting the candidate position.

Figure 8:
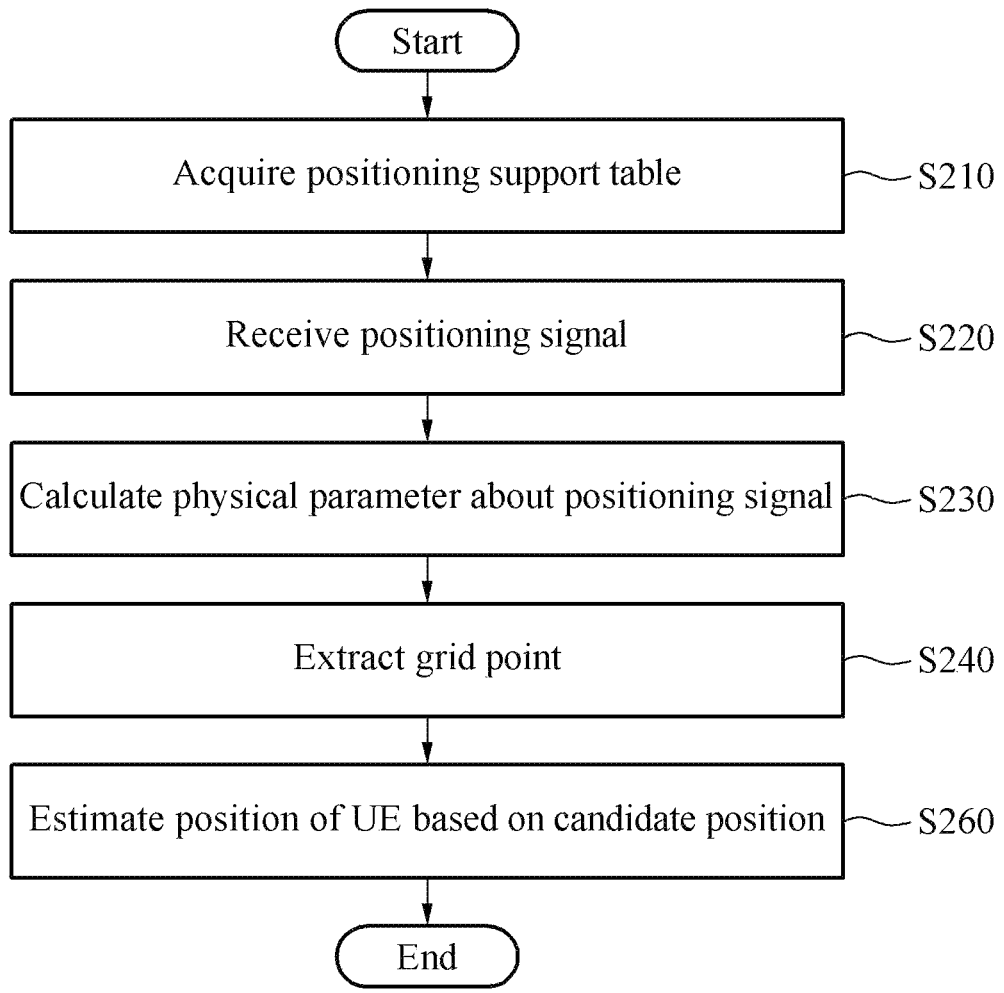
FIG. 8 is a flowchart illustrating another example of a positioning method of a UE according to at least one example embodiment.

FIG. 8 is a flowchart illustrating another example of a positioning method of the UE 300 according to at least one example embodiment. Description made above with FIG. 7 is omitted here.

Referring to FIG. 8, in operation S250, the UE 300 may estimate the position of the UE 300 by determining a candidate position based on the extracted grid point and by correcting the candidate position.

When the UE 300 extracts a single grid point, the UE 300 may determine the extracted grid point as the candidate position. When the UE 300 extracts a plurality of grid points, the UE 300 may determine a center point of the plurality of grid points as the candidate position. If necessary, the UE 300 may remove an outlier from the plurality of grid points and may determine a center point of the remaining grid points as the candidate position.

Figure 9:
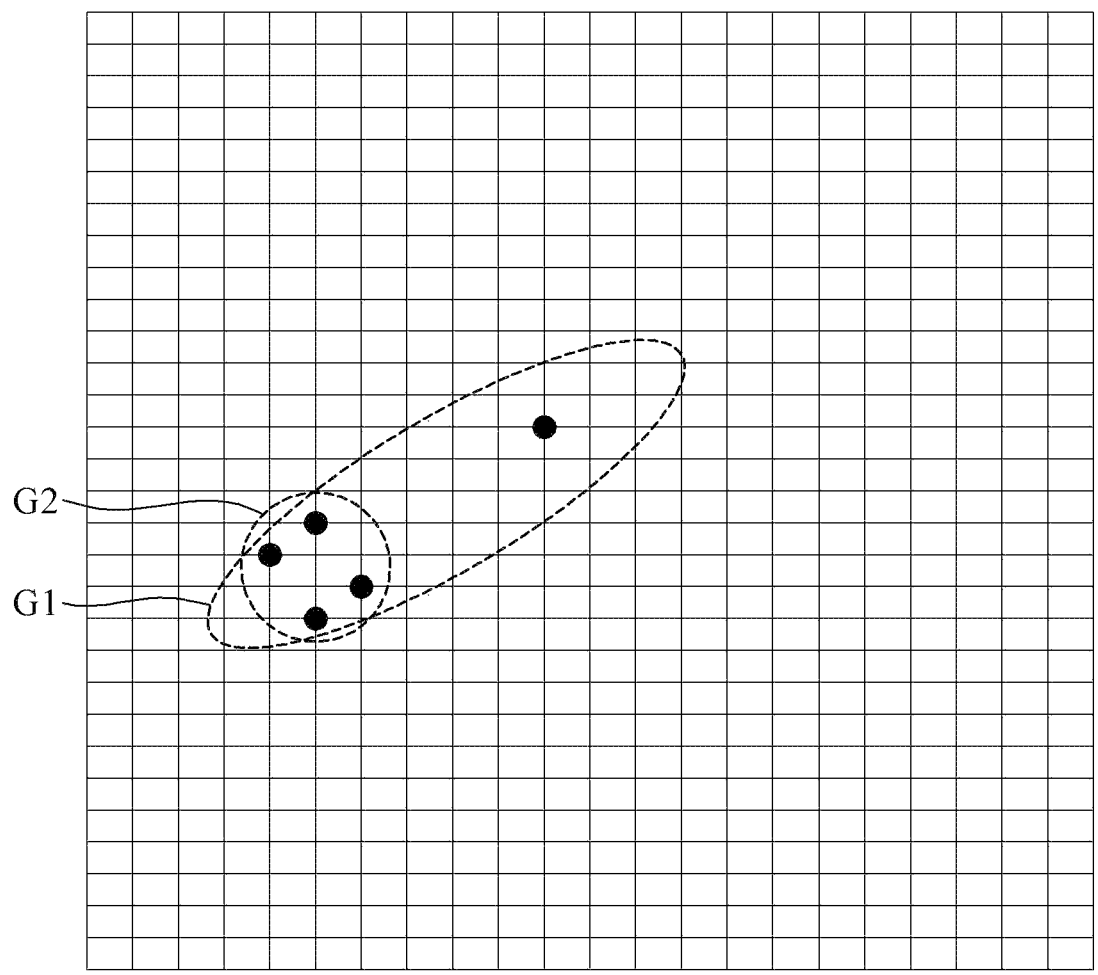
FIG. 9 illustrates an example of removing, by a UE, an outlier according to at least one example embodiment.

FIG. 9 illustrates an example of removing, by the UE 300, an outlier according to at least one example embodiment.

Although FIG. 9 illustrates grid points on a two-dimensional (2D) plane for clarity of description, it is provided as an example only. For example, the grid points may be three-dimensionally aligned.

Referring to FIG. 9, the UE 300 may determine, as a first candidate group G1, grid points extracted based on an output value of a cost function. The UE 300 may remove an outlier from the grid points included in the first candidate group G1. The UE 300 may remove the outlier based on a distance between the grid points included in the first candidate group G1. The UE 300 may determine a second candidate group G2 by removing the outlier from the first candidate group G1. The UE 300 may determine a candidate position based on coordinates of a grid point included in the second candidate group G2. For example, the UE 300 may determine a center point of the grid points included in the second candidate group G2 as the candidate position.

The UE 300 may estimate a position of the UE 300 by correcting the candidate position. The UE 300 may correct the candidate position based on a correction value stored in a positioning support table. When the UE 300 determines the candidate position based on a single grid point, the UE 300 may correct the candidate position based on a correction value corresponding to the single grid point. As another example, when the UE 300 determines the candidate position based on a plurality of grid points, the UE 300 may determine the candidate position using an average or linear sum of correction values corresponding to the plurality of grid points.

Hereinafter, an example embodiment in which the UE 300 corrects the candidate position is described.

The UE 300 may calculate a corrected distance difference vector according to Equation 5.

$$\begin{bmatrix} \Delta_{ab} \\ \Delta_{ac} \\ \Delta_{ad} \\ \vdots \end{bmatrix} = \begin{bmatrix} r_{ab} - d_{ab} \\ r_{ac} - d_{ac} \\ r_{ad} - d_{ad} \\ \vdots \end{bmatrix}$$ [Equation 5]

In Equation 5, each of $r_{ab}$, $r_{ac}$, $r_{ad}$ ... denotes a difference of pseudo range of a positioning signal received by the UE 300, each of $d_{ab}$, $d_{ac}$, $d_{ad}$ ... denotes a correction value corresponding to a grid point in the positioning support table, and each of $\Delta_{ab}$, $\Delta_{ac}$, $\Delta_{ad}$ ... denotes a corrected distance difference. The UE 300 may correct a difference of pseudo range between positioning signals according to Equation 5. The corrected difference of pseudo range may be similar to a straight distance between the UE 300 and each of the base stations. The UE 300 may estimate a position of the UE 300 using an algorithm, for example, a trilateration, based on the corrected difference of pseudo range.

The UE 300 may estimate the position of the UE 300 by performing a position estimation operation at least once based on a Tayler deployment method. The UE 300 may calculate an (n=1)-th estimation distance difference from an n-th estimation distance difference. The n-th estimation distance difference may be represented by Equation 6.

$$G(P_n)_{ab} = L_a - L_b = \sqrt{(a_x - x_n)^2 + (a_y - y_n)^2 + (a_z - z_n)^2} - \sqrt{(b_x - x_n)^2 + (b_y - y_n)^2 + (b_z - z_n)^2}$$ [Equation 6]

In Equation 6, each of a and b denotes an index of a corresponding base station, $G(P_n)_{ab}$ denotes the n-th estimation distance difference, $L_a$ denotes an n-th estimation straight distance between an a-th base station and the UE 300, and $L_b$ denotes an n-th estimation straight distance between a b-th base station and the UE 300. Here, $G(P_0)_{ab}$ may be determined based on a distance difference vector calculated according to Equation 5. Also, $G(P_0)_{ab}$ denotes an initial value of iterative estimation operation. As $G(P_0)_{ab}$ becomes closer to an actual distance difference, a position estimation accuracy of the UE 300 may be enhanced. According to the example embodiments, since the UE 300 determines the candidate position using the positioning support table, $G(P_0)_{ab}$ may become closer to the actual distance difference.

The UE 300 may calculate a partial differential coefficient matrix by performing a partial differentiation on $G(P_n)_{ab}$. For example, the UE 300 may calculate the partial differential coefficient matrix according to Equation 7.

$$D = \begin{bmatrix} \frac{\partial G(P_n)_{ab}}{\partial x} & \frac{\partial G(P_n)_{ab}}{\partial y} & \frac{\partial G(P_n)_{ab}}{\partial z} \\ \frac{\partial G(P_n)_{ac}}{\partial x} & \frac{\partial G(P_n)_{ac}}{\partial y} & \frac{\partial G(P_n)_{ac}}{\partial z} \\ \vdots & \vdots & \vdots \end{bmatrix}$$ [Equation 7]

In Equation 7, D denotes the partial differential coefficient matrix, each of $G(P_n)_{ab}$, $G(P_n)_{ac}$ ... denotes an n-th estimation distance difference, and each of a, b, c ... denotes an index of a corresponding base station.

The UE 300 may calculate an (n+1)-th estimation position according to Equation 8.

$$P_{n+1} = P_n + pinv(D)M_n$$ [Equation 8]
$$P_{n+1} = P_n + D^\dagger M_n$$

$$M_n = \begin{bmatrix} \Delta_{ab} - G(P_n)_{ab} \\ \Delta_{ac} - G(P_n)_{ac} \\ \Delta_{ad} - G(P_n)_{ad} \\ \vdots \end{bmatrix}$$

In Equation 8, $P_n$ denotes an n-th estimation position coordinate vector, pinv(D) denotes a moore-penrose inverse function of the partial differential coefficient matrix D, and $M_n$ denotes an error vector that is acquired by subtracting the n-th estimation distance difference vector of Equation 6 from the corrected distance difference vector of Equation 5.

The position estimation method described above with reference to Equation 7 and Equation 8 is provided as an example only. The UE 300 may estimate the position of the UE 300 using a maximum likelihood estimation method, Chan's method, and the like.

The positioning support table generation method and the positioning method using the positioning support table according to at least one example embodiment is described above with reference to FIGS. 1 to 9. According to at least one example embodiment, it is possible to maintain a relatively high positioning performance using a positioning support table without significantly reducing an update period of the positioning support table. Therefore, it is possible to reduce cost required to update the positioning support table. Also, according to at least one example embodiment, it is possible to easily extract a grid point corresponding to an environment similar to an actual environment using a positioning support table. Also, according to at least one example embodiment, it is possible to improve a positioning performance by correcting a candidate position using a correction value stored in a positioning support table.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A positioning support table generation method performed by a computing apparatus, the method comprising:
    generating a three-dimensional (3D) map based on geographic and building information about a predetermined area;
    setting a plurality of grid points on the 3D map;
    determining a first base station corresponding to a grid point with respect to each of the plurality of grid points set on the 3D map;
    calculating at least one physical parameter about a first signal that arrives at the grid point from the first base station and at least one physical parameter about a second signal that arrives at the grid point from a second base station that is one of base stations adjacent to the first base station; and
    generating a positioning support table based on the at least one physical parameter about the first signal and the at least one physical parameter about the second signal,
    wherein the at least one physical parameter comprises a first pseudo range between the first base station and the grid point and a second pseudo range between the second base station and the grid point, a first straight distance between the first base station and the grid point and a second straight distance between the second base station and the grid point, and
    the positioning support table is generated based on a difference of pseudo range between the first pseudo range and the second pseudo range, and a difference of straight distance between the first straight distance and the second straight distance.

2. The method of claim 1, wherein the calculating further comprises:
    calculating a correction value based on a difference between the difference of pseudo range and the difference of straight distance, and storing the difference of pseudo range and the correction value in the positioning support table.

3. The method of claim 1, wherein the at least one physical parameter comprises an angle difference between a direction in which the first signal from the first base station arrives at the grid point and a direction in which the second signal from the second base station arrives at the grid point, and the positioning support table is generated based on the angle difference.

4. The method of claim 1, further comprising:
    calculating at least one of straight distances between the grid point and a plurality of base stations, pseudo ranges between the grid point and the plurality of base stations, and strengths of signals that arrive at the grid point from the plurality of base stations, and determining the first base station corresponding to the grid point based on a calculation result.

5. A positioning method performed by a user equipment, the method comprising:
    acquiring information about a positioning support table that is generated based on at least one physical parameter about a first signal that arrives at a grid point from a first base station set with respect to each of a plurality of grid points set on a three-dimensional (3D) map about a predetermined area and at least one physical parameter about a second signal that arrives at the grid point from a second base station that is one of base stations adjacent to the first base station;
    receiving positioning signals from at least two base stations;
    extracting at least one grid point from among the plurality of grid points based on positioning information about the positioning signals and information recorded in the positioning support table;
    calculating a difference of pseudo range between the positioning signals based on at least one of a point in time and a phase at which each of the positioning signals is received; and
    extracting the at least one grid point from among the plurality of grid points based on a difference of pseudo range stored in the positioning support table and the difference of pseudo range between the positioning signals.

6. The method of claim 5, wherein the extracting comprises:
    calculating an output value of a cost function based on the difference of pseudo range stored in the positioning support table and the difference of pseudo range between the positioning signals, and extracting the at least one grid point from among the plurality of grid points based on the output value of the cost function.

7. The method of claim 6, further comprising:
    determining, as a first candidate group, a plurality of grid points extracted based on the output value of the cost function, determining a second candidate group by removing an outlier from the first candidate group, and determining a candidate position based on coordinates of a grid point included in the second candidate group.

8. The method of claim 5, wherein the positioning support table comprises information about a correction value that is determined based on a difference of pseudo range and a difference of straight distance at each of the plurality of grid points, and
    the method further comprises estimating a position of the user equipment by correcting a candidate position determined by at least one grid point extracted based on the correction value.

9. The method of claim 8, wherein the estimating comprises:
    estimating the position of the user equipment by performing a position estimation operation at least once based on a Taylor deployment method using the candidate position and the correction value.

10. The method of claim 9, wherein the estimating comprises:
calculating a partial differential coefficient matrix by performing a partial differentiation on a difference of distance calculated at a position estimated by an n-th estimation operation;
calculation an error vector using the difference of distance and the correction value; and
calculating an (n+1)-th estimation position from an n-th estimation position using the partial differential coefficient matrix and the error vector.

11. The method of claim 5, wherein the extracting comprises:
calculating a difference between angles of arrival of the positioning signals, and extracting at least one grid point from among the plurality of grid points based on a difference between angles of arrival stored in the positioning support table and the difference between angles of arrival of the positioning signals.

12. A user equipment comprising:
a communication interface configured to perform communication with another apparatus;
a processor; and
a memory configured to store at least one instruction executed through the processor,
wherein the at least one instruction is executed to acquire information about a positioning support table that is generated based on at least one physical parameter about a first signal that arrives at a grid point from a first base station set with respect to each of a plurality of grid points set on a three-dimensional (3D) map about a predetermined area and at least one physical parameter about a second signal that arrives at the grid point from a second base station that is one of base stations adjacent to the first base station, to receive positioning signals from at least two base stations, to extract at least one grid point from among the plurality of grid points based on positioning information about the positioning signals and information recorded in the positioning support table, calculate a difference of pseudo range between the positioning signals based on at least one of a point in time and a phase at which each of the positioning signals is received, and to extract the at least one grid point from among the plurality of grid points based on a difference of pseudo range stored in the positioning support table and the difference of pseudo range between the positioning signals.

13. The user equipment of claim 12, wherein the positioning support table comprises information about a correction value that is determined based on a difference of pseudo range and a difference of straight distance at each of the plurality of grid points, and
the at least one instruction is executed to estimate a position of the user equipment by correcting a candidate position determined by at least one grid point extracted based on the correction value.

14. The user equipment of claim 13, wherein the at least one instruction is executed to estimate the position of the user equipment by performing a position estimation operation at least once based on a Taylor deployment method using the candidate position and the correction value.

* * * * *